United States Patent
Gruber et al.

(10) Patent No.: US 7,222,492 B2
(45) Date of Patent: May 29, 2007

(54) CHILLED WATER STORAGE FOR MILK COOLING PROCESS

(76) Inventors: Duane A. Gruber, 37-b Hadley Rd., Greenville, PA (US) 16125; Michael E. Gruber, 37-b Hadley Rd., Greenville, PA (US) 16125

(*) Notice: Subject to any disclaimer, the term of this patent is extended or adjusted under 35 U.S.C. 154(b) by 336 days.

(21) Appl. No.: 11/012,320

(22) Filed: Dec. 16, 2004

(65) Prior Publication Data

US 2005/0091994 A1   May 5, 2005

Related U.S. Application Data

(62) Division of application No. 10/446,821, filed on May 29, 2003, now Pat. No. 6,857,278.

(60) Provisional application No. 60/383,578, filed on May 29, 2002.

(51) Int. Cl.
*F25D 17/02* (2006.01)
*A01J 5/00* (2006.01)

(52) U.S. Cl. .............. 62/99; 62/201; 62/396; 119/14.09

(58) Field of Classification Search .............. 62/99, 62/201, 396, 434; 119/14.09, 14.4; 220/592.12
See application file for complete search history.

(56) References Cited

U.S. PATENT DOCUMENTS

| | | | |
|---|---|---|---|
| 2,024,639 A | 12/1935 | Greene | |
| 2,495,625 A | 1/1950 | Bodinus | |
| 3,120,110 A | 2/1964 | Russell | |
| 3,271,968 A | 9/1966 | Gunther | |
| 4,130,996 A | 12/1978 | Sult | |
| 4,280,335 A | 7/1981 | Perez et al. | |
| 4,351,271 A | 9/1982 | Mueller et al. | |
| 5,267,448 A * | 12/1993 | Van Den Heuvel | 62/64 |
| 6,131,398 A | 10/2000 | Versteijnen | |
| 6,216,469 B1 | 4/2001 | Miller | |
| 6,431,403 B1 | 8/2002 | Davis | |
| 6,857,278 B2 * | 2/2005 | Gruber et al. | 62/99 |

* cited by examiner

*Primary Examiner*—Marc Norman
(74) *Attorney, Agent, or Firm*—Richard C. Litman

(57) ABSTRACT

A process for cooling liquids wherein a coolant is cooled in a chiller during off-peak electrical demand periods, then directed to a first insulated storage vessel where it is stored until off-peak electrical demand periods have ended. During peak electrical demand periods, the coolant flows from the first insulated storage vessel to a flat plate heat exchanger, where a flow of liquid to be cooled, entering through a second conduit, is cooled. The cooled liquid exiting the heat exchanger is directed to a second insulated storage vessel where little or no further cooling of the liquid will be necessary during peak electrical demand periods.

8 Claims, 1 Drawing Sheet

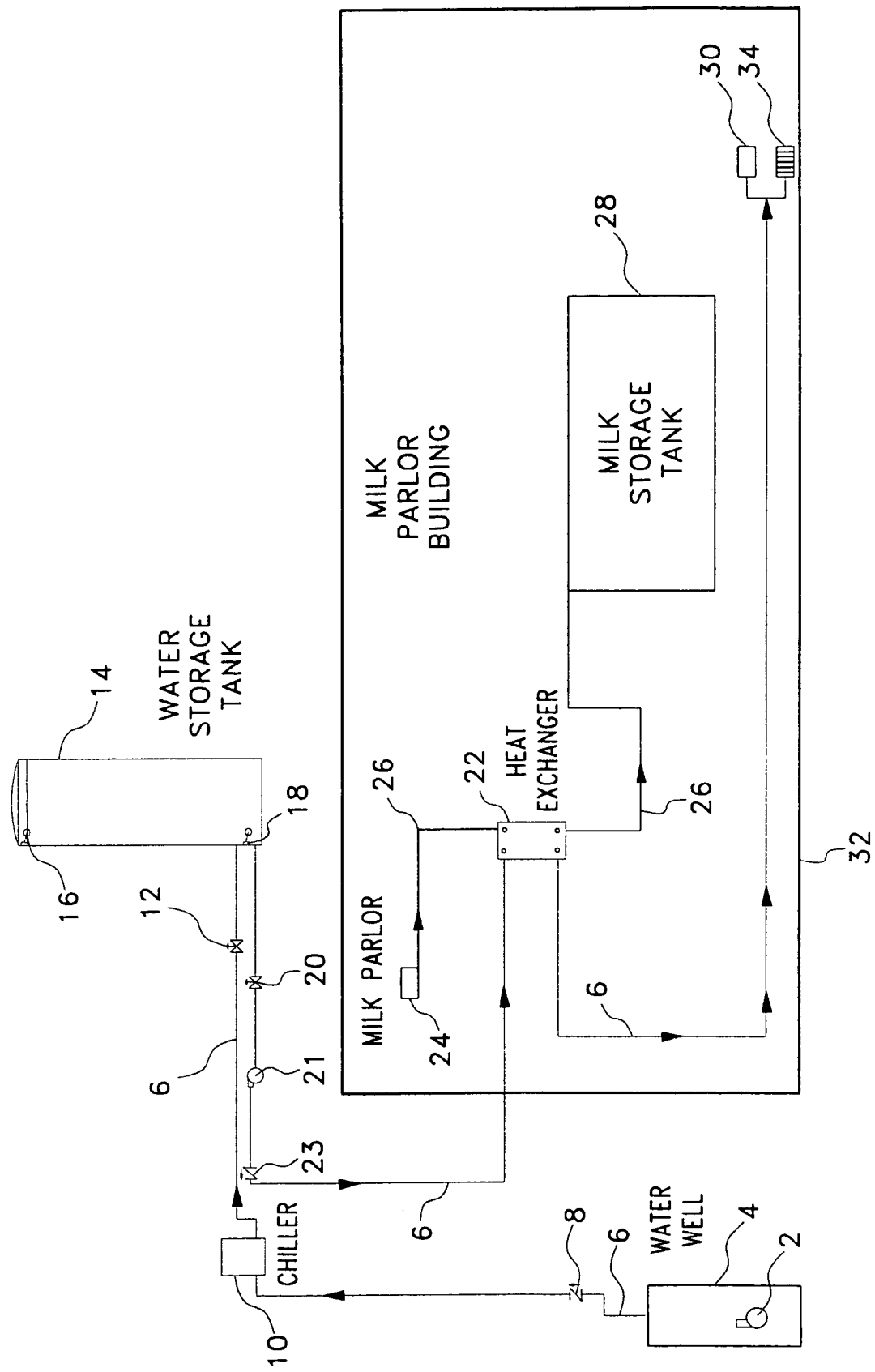

CHILLED WATER STORAGE FOR MILK COOLING PROCESS

CROSS-REFERENCE TO RELATED APPLICATIONS

This application is a division of application Ser. No. 10/446,821 filed May 29, 2003 now U.S. Pat. No. 6,857,278 which claims the benefit of U.S. Provisional Patent Application Ser. No. 60/383,578, filed May 29, 2002.

BACKGROUND OF THE INVENTION

1. Field of the Invention

The present invention relates to a cooling process for liquids, and specifically, a cooling process for liquids utilizing a coolant liquid which is chilled during off-peak electrical demand periods.

2. Description of Related Art

Cow's milk as it comes from the cow has a temperature of over 90° Fahrenheit. At this temperature, bacteria multiply with great rapidity. Thus, milking operations in most states are controlled by strict regulations, requiring for example, that bulk milk shall be cooled to 38–40 degrees Fahrenheit within two hours of milking. Consequently, in order to comply with state requirements pertaining to the cooling of milk, the majority of dairy farms operate costly refrigeration equipment on a 24-hour basis.

In order to avoid inefficient consumption of energy while cooling milk or other liquids, it would be advantageous for cooling processes to employ the use of thermal storage, whereby heat is extracted from a thermal reservoir during one time period and, during a different time period, the reservoir is used to extract heat from a different environment. In this manner, electricity usage is shifted from a peak demand period to an off-peak period. This shift assists commercial power generation companies to handle peak electricity usage, especially in major metropolitan areas where the peak power demand on the power generation of a utility on a very hot day can put a severe strain on the power generation system. Furthermore, shifting electricity usage to off-peak periods such as nighttime hours, allows significant cost savings to the consumer, as less expensive electricity is generally available at night and lower ambient temperatures allow for more efficient heat rejection.

Pre-cooling the liquid prior to directing it into the storage tank is another method by which energy can be conserved. Pre-cooling liquids minimizes the rise in temperature associated with mixing high temperature liquid with already cooled liquid that is in the storage tanks. As such, instead of placing a liquid directly into a storage tank, it is more energy efficient to pre-cool the liquid to a temperature approaching that of the storage temperature before directing it into the storage tank in order to refrigerate what may be a large quantity of liquid over a smaller and lower temperature range, rather than cooling the same quantity of liquid directly in the storage tank over a large temperature range.

Prior art cooling processes have failed to achieve a simplified cooling process which fully realizes the potential for increased energy efficiency by neglecting to incorporate use of thermal storage, a pre-cooling step, or an effective combination of both processes.

U.S. Pat. No. 2,024,639, issued Dec. 17, 1935 to O. Greene, discloses cooling raw milk in a process wherein the raw milk is cooled by passing it as a thin film over the walls of a storage tank encircled by a refrigerant-filled jacket. As the storage tank for the milk also serves as the cooling unit, this cooling process relies heavily on constant refrigeration and is subject to the drawbacks mentioned above associated with cooling systems which lack a separate pre-cooling phase before the milk is directed into the storage tank.

U.S. Pat. No. 2,495,625, issued Jan. 24, 1950 to W. Bodinus, discloses a cooling process for wort involving a plurality of steps, including using water for cooling wort in the pre-cooling and intermediate stages and then for condensing refrigerant used in a third cooling stage. This process, while incorporating a pre-cooling phase, remains significantly dependent on a continuously operated refrigeration machine.

International Patent No. WO 98/15787, published Apr. 16, 1998, discloses a cooling system particularly, but not exclusively for milk which is transferred from a milking station to a vat along a first flow path and then exits the vat along a second flow path in which the milk is cooled before reentering the same vat. In this process, pre-cooling of milk is not employed and constant operation of a refrigeration unit is required.

U.S. Pat. No. 4,130,996, issued Dec. 26, 1978 to G. M. Sult, describes a bulk-milk cooling reservoir with an evaporation unit inside the reservoir and a condenser for recycling water to the evaporation unit. U.S. Pat. No. 4,351,271, issued Sep. 28, 1982 to Mueller et al., discloses a refrigerated receiver for an automatic milking system having an improved plate type heat exchanger inside the receiver for pre-cooling the milk. U.K. Patent No. 2,046,073, published Nov. 12, 1980, teaches a milk pasteurization apparatus and method, including heating and cooling the milk.

None of the above inventions and patents, taken either singly or in combination, is seen to describe the instant invention as claimed.

SUMMARY OF THE INVENTION

A process for cooling a liquid according to the present invention is as follows. During off-peak electrical demand periods, such as nighttime, a coolant liquid, is directed by a first conduit through a chiller. The coolant liquid is cooled in the chiller and then directed from the chiller into a first insulated storage vessel until peak electrical demand periods begin. During peak electrical demand periods, the chilled coolant liquid flows from the insulated storage vessel to a flat plate heat exchanger where a flow of liquid to be cooled, such as milk, entering through a second conduit is cooled. After cooling, the liquid (e.g., milk) exiting the heat exchanger is directed to a second insulated storage vessel where little or no further cooling of the cooling liquid will be necessary during peak electrical demand periods. Spent coolant liquid exiting the flat plate heat exchanger, is directed by a waste line to a depository for other use.

A preferred embodiment of the present invention is a process for cooling milk during peak electrical demand periods as follows. During off-peak electrical demand periods, water, typically at a temperature of about 55 degrees Fahrenheit, is directed from a water source, preferably a water well, by a first conduit through a chiller. The water is cooled in the chiller to approximately 36 degrees Fahrenheit and then directed from the chiller into an insulated water storage tank. During peak electrical demand periods, chilled well water flows from the insulated water storage tank to a flat plate heat exchanger where a flow of raw milk from a milking parlor, which is typically at a temperature of about 101 degrees Fahrenheit, simultaneously enters the flat plate heat exchanger through a second conduit. The milk is cooled to a temperature of about 38–42 degrees Fahrenheit. The cooled milk exiting the heat exchanger is directed to insulated bulk milk storage tanks or refrigerated milk tanker trucks, where it is stored at a temperature of about 38 degrees Fahrenheit. As this is the desired temperature for storing milk, little or no further cooling of the milk will be necessary during peak electrical demand periods. Waste water exiting the heat exchanger, at a temperature typically of about 72 degrees Fahrenheit, is directed by a waste line to either a cattle watering station, or a cattle barn where the water may be used by mistifiers to cool cattle.

Accordingly, it is a principal object of this invention to provide a simplified process for cooling liquids during peak electrical demand periods with a coolant liquid that is chilled during off-peak electrical demand periods.

It is another object of this invention to provide a simplified process for cooling liquids such that the liquids are significantly cooled with little or no use of refrigeration units during peak electrical demand periods.

It is a further object of the invention to ease strains on a state's electrical power grid system in an economical and environmentally safe way.

Still another object of the invention is to increase milk production without adding refrigeration capacity.

Additionally, it is an object of the invention to conserve water by recycling water from a milk cooling apparatus for cattle watering and as a water source for mistifiers for cooling cattle.

It is an object of the invention to provide improved elements and arrangements thereof in a process for the purposes described which is inexpensive, dependable and fully effective in accomplishing its intended purposes.

These and other objects of the present invention will become readily apparent upon further review of the following specification and drawings.

BRIEF DESCRIPTION OF THE DRAWING

The sole FIGURE is a schematic block diagram depicting a process for cooling milk according to the present invention.

DETAILED DESCRIPTION OF THE PREFERRED EMBODIMENT

The present invention relates to a process for cooling liquids, wherein a coolant liquid is chilled during off-peak electrical demand periods, and, in the subsequent peak electrical demand periods, the chilled coolant is used to cool a liquid, e.g., milk, so that little or no consumption of energy will be required to further cool the liquid during peak electrical demand periods. A preferred embodiment for the process of the present invention is a process for cooling milk as depicted in the sole drawing FIGURE. During off-peak electrical demand periods, water obtained from a water well 4, typically at a temperature of about 55° Fahrenheit, is advanced by a pump 2 through a first conduit 6 to a cooling vessel, such as an air cooled water chiller 10, where the water is then chilled to a temperature of about 36° Fahrenheit. The flow of water from the water well 4 is reinforced by a conventional check valve 8 which ensures that there is no backflow of water. The first conduit 6 is preferably process piping for food preparation, made from high grade stainless steel, having a grade of 316, 304, or 304LL.

The water from the chiller 10 flows through the conduit 6 and advances through control valves 12 to at least one insulated water storage tank 14. More than one storage tank may be used if attached in a parallel fashion, to achieve the same effect. The storage tank 14 is preferably a potable water storage tank that is non-stratified. The storage tank 14 is insulated to limit heat gain so that water in the storage tank does not rise over 0.5° Fahrenheit over a period of eight hours. The storage tank 14 contains a high-level switch 16 near its top end, and a low level switch 18 near its bottom end. The first set of control valves 12 1and a second set of control valves 20 are operated by an automated control system to control the flow of water in and out of the storage tank 14. The first set of control valves 12 is turned on during off-peak electrical demand periods, while the water fills the storage tank 14. The flow of water into the storage tank continues until the water in the storage tank 14 reaches a high-level switch 16, at which point the automated control system shuts off the first set of control valves 12 and the chiller 10, and the chilled water in the storage tank 14 is stored in the storage tank 14 at a temperature of about 36° Fahrenheit until peak electrical demand periods begin.

Once the off-peak electrical demand periods have ended, the automated control system opens the second set of control valves 20 which allows chilled water from the storage tank 14 to flow through the first conduit 6 downstream from storage tank 14. The water is then advanced by a second pump 21 through a second check valve 23 and towards a flat plate heat exchanger 22 contained within a milking parlor building 32. Simultaneously through a second conduit 26, a flow of raw milk from the milking parlor 24 also enters the flat plate heat exchanger 22 at a temperature of about 101° Fahrenheit 26, where the raw milk is cooled to a temperature of about 36–42 degrees Fahrenheit. The flow of milk is advanced by a vacuum system conventionally used in automated milking systems. The second conduit 26 is preferably process piping for food preparation, made from high grade stainless steel, having a grade of 316, 304, or 304LL. While the flat plate heat exchanger 22 can be any conventional stainless steel flat plate heat exchanger designed for food preparation, one having type 304 stainless steel end frames and stainless steel compressor bolts is preferred.

The milk and water exit the flat plate heat exchanger 22 simultaneously through separate conduits. Milk exiting the flat plate heat exchanger 22 through the second conduit 26 has a temperature of about 36–42 degrees Fahrenheit, while the waste water exiting the flat plate heat exchanger through the first conduit 6 has a temperature of about 72° Fahrenheit. The waste water advances towards a cattle watering site 30 or to cattle barns 34, where it may be used by mistifiers to cool cows during warm weather. The milk advances through the second conduit 26 towards insulated storage vessels 28 where it is stored at the desired temperature of about 38° Fahrenheit. The insulated storage vessels can either be bulk storage tanks on the dairy farm or self-contained refrigerated milk tanker trucks.

EXAMPLE

The following example is illustrative of a possible application of the process of the present invention in a typical dairy farm and is not intended to be a limitation thereon. Table 1 depicts technical data for a hypothetical dairy farm. Table 2 depicts energy consumption in the dairy farm, which is based on a typical Time of Use (TOU) Rate Schedule. Table 3 depicts calculated energy savings which should be achievable using the present invention for the dairy farm based on the data provided in Tables 1 and 2.

TABLE 1

| | |
|---|---|
| Approximate # of Cattle Milked per Day | 780–790 |
| Approximate Total Milk Production per Day | 6,960 gal/day |
| Milking Period/Cycle | 24 hours |
| Milk Temperature Leaving Cow | 101 deg/F. |
| Milk Bulk Storage Temperature | 38 deg/F. |
| Process Cooling Delta Temperature | 63 deg/F. |
| Allowable Time to Achieve Process Delta | 4–5 minutes |
| Milk Main Process Cooling Equipment Capacity | 30 ton DX refrigeration |
| Volume of Chilled Water to cool Gallon of Milk | 1.5 gal Water: 1 gal Milk |

TABLE 2

| | Energy Consumption (kWh/yr.) | Energy Cost (kW/h) | Energy Cost (yr) |
|---|---|---|---|
| On-Peak | 28,350 | $0.172514 | $4,891 |
| Shoulder | 43,200 | $0.081214 | $3,508 |
| Off-Peak | 220,770 | $0.038544 | $8,509 |
| Total | | | $16,909 |

TABLE 3

| | Energy Consumption (kWh/yr) | Energy Cost (kWh) | Energy Cost (yr) |
|---|---|---|---|
| On-Peak | Shifted | shifted | — |
| Shoulder | Shifted | shifted | — |
| Off-Peak | 284,142 | $0.038544 | $10,952 |
| Total | | | $5,957 |
| Savings (yr) | | | |

Although its primary use is for cooling milk, the present invention may be used for cooling other liquids, including but not limited to dairy products, beverage products such as beer, juice products, noncarbonated soda water, as well as pre-made tea and coffee beverages. Furthermore, in addition to well water, the coolant liquid employed in the present invention may include but is not limited to water obtained from one of many sources, including but not limited to streams, reservoirs, lakes, and rivers, as well as mixtures of water and glycol.

It is to be understood that the present invention is not limited to the sole embodiments described above, but encompasses any and all embodiments within the scope of the following claims.

We claim:

1. A cooling system for cooling milk comprising:
   (a) a cooling vessel for chilling a supply of water during a time period of off-peak electrical usage;
   (b) a first insulated storage vessel connected to the cooling vessel for storing the chilled water
   (c) a flat plate heat exchanger;
   (d) a second insulated storage vessel;
   (e) a first conduit extending from said first insulated storage vessel to said flat plate heat exchanger and from said flat plate heat exchanger to a recycling station; and
   a second conduit extending from a milking parlor to said flat plate heat exchanger and from said flat plate heat exchanger to said second insulated storage vessel.

2. The system according to claim 1, wherein said cooling vessel is an air cooled water vessel.

3. The system of claim 2, wherein said recycling station comprises mistifiers in cattle barns.

4. The system according to claim 1, wherein said first insulated storage vessel is a non-stratified, potable water storage tank.

5. The system of claim 1, wherein said first and second conduits are each process piping for food preparation.

6. The system of claim 1, wherein said second insulated storage vessel is a bulk storage tank.

7. The system of claim 1, wherein said second insulated storage vessel is a refrigerated milk tanker truck.

8. The system of claim 1, wherein said recycling station comprises a cattle watering site.

\* \* \* \* \*